UNITED STATES PATENT OFFICE.

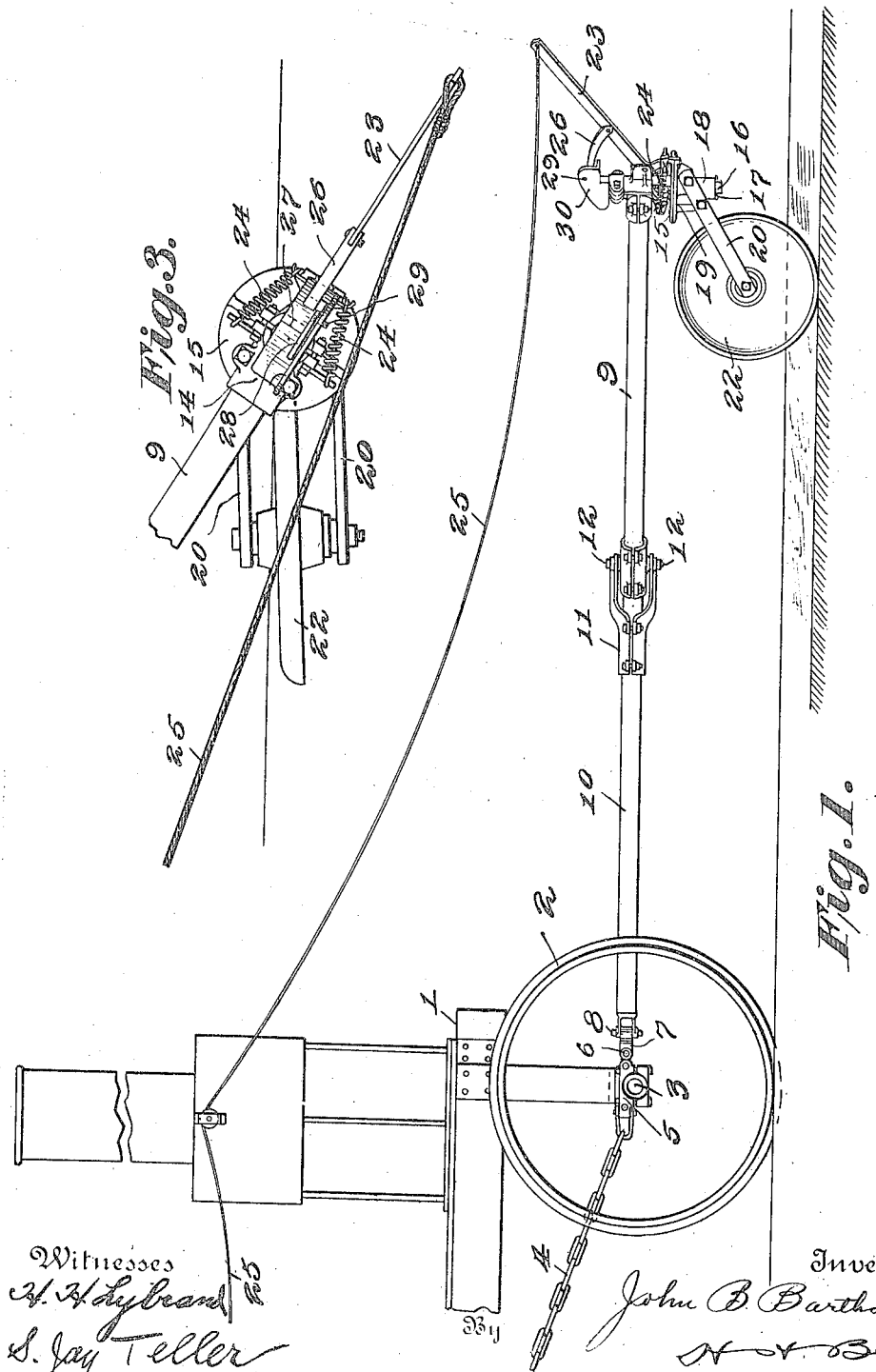

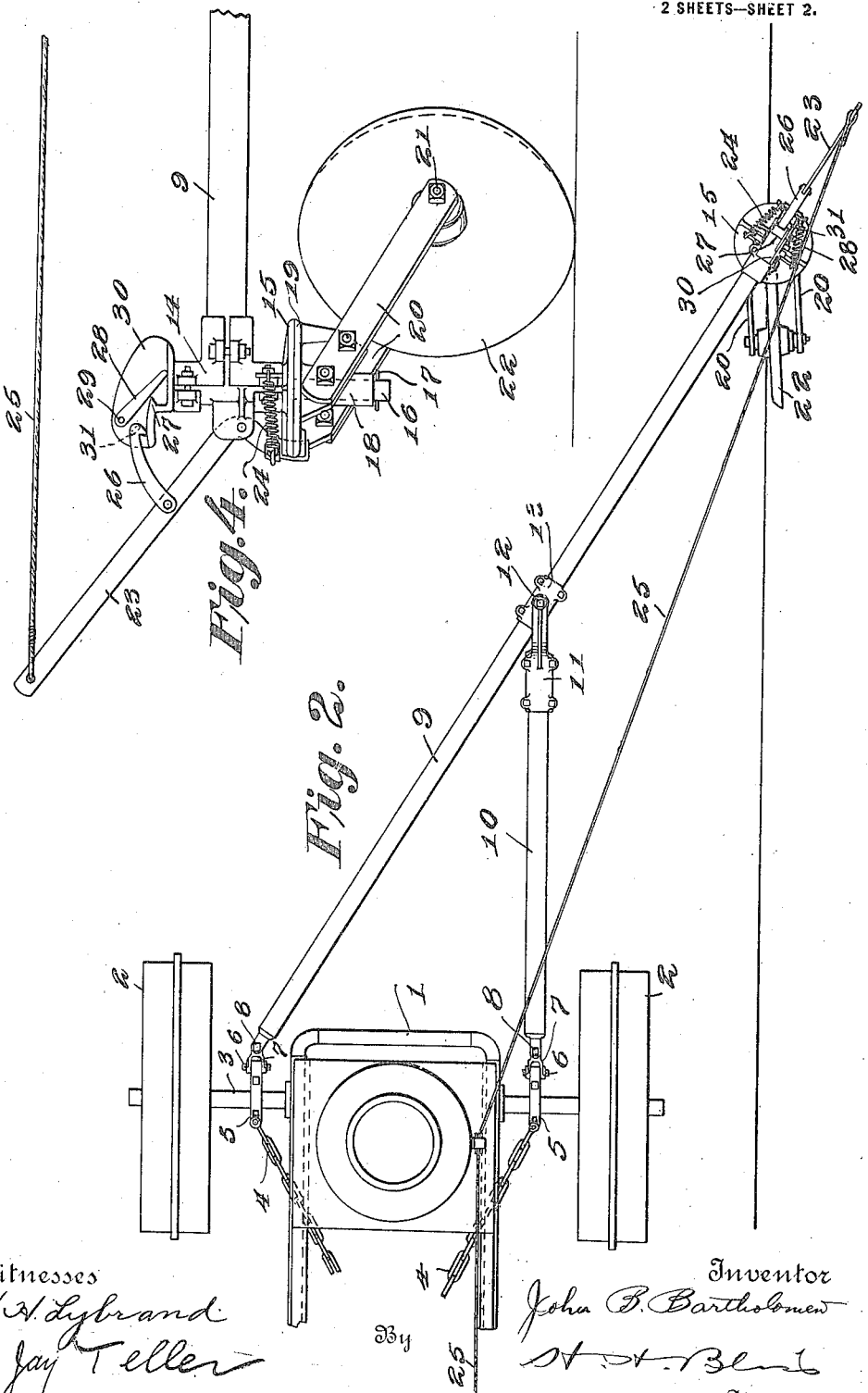

JOHN B. BARTHOLOMEW, OF PEORIA, ILLINOIS, ASSIGNOR TO AVERY COMPANY, OF PEORIA, ILLINOIS, A CORPORATION OF ILLINOIS.

STEERING DEVICE FOR TRACTORS.

1,248,599.  Specification of Letters Patent.  Patented Dec. 4, 1917.

Application filed January 7, 1914. Serial No. 810,864.

*To all whom it may concern:*

Be it known that I, JOHN B. BARTHOLOMEW, a citizen of the United States, residing at Peoria, in the county of Peoria and State of Illinois, have invented certain new and useful Improvements in Steering Devices for Tractors, of which the following is a specification, reference being had therein to the accompanying drawing.

The invention relates to steering devices adapted to be attached to the front wheels of a tractor and to be used for automatically guiding the tractor when it is used for hauling a gang plow. The steering device is adapted to follow in the last furrow turned by the plow on its preceding course around or along the field.

I am aware that many devices of this general character have been heretofore proposed. However, the earlier devices of which I am aware have been open to certain serious objections. One of the most important of these objections arose from the fact that the presence of the automatic steering device made it impossible for the tractor to be manually steered when desired as, for instance, when turning corners.

The principal object of my invention is to provide an automatic steering device of this character in which the guiding wheel is swiveled upon its supporting arm so that it can caster when the wheels are turned manually. A lock is provided for normally holding the wheel against castering, and this lock can be manually released, as desired. A further object of the invention is to provide improved means whereby the steering device can be adjusted laterally to cause the tractor to travel at different distances from the guiding furrow.

Of the accompanying drawings which show the embodiment of my invention now deemed preferable,—

Figure 1 is a side elevation showing the front part of a tractor with the guiding mechanism attached.

Fig. 2 is a plan view of the parts shown in Fig. 2.

Fig. 3 is a fragmentary plan view, on an enlarged scale, of the guiding wheel and its connections.

Fig. 4 is a side elevation, on an enlarged scale, of the parts shown in Fig. 3.

Referring to the drawings, 1 represents the main frame of the tractor; 2, 2, the front ground wheels, and 3 the axle which is connected to the main frame for movement about a vertical axis. Any usual or preferred means can be provided for manually turning the axle to steer the tractor. In the drawings I have shown at 4 the forward part of a mechanism suitable for this purpose.

Secured to the axle near the wheels are two clamps 5, 5. Each of the clamps 5, 5 carries at its forward end a horizontal pivot pin 6 upon which is mounted a knuckle 7. Each knuckle 7 carries at its forward end a vertical pivot pin 8. Pivoted upon the pin 8 at the left-hand side of the machine is a long bar or rod 9 which may conveniently be a section of pipe. Pivoted to the pin 8 at the right-hand side of the machine is another shorter rod or bar 10 which may also be a section of pipe. Secured to the forward end of the bar 10 is a forked bracket 11, the prongs of which are adapted to receive the trunnions 12, 12, formed on the clamp 13 which is adjustably held upon the rod 9. It will be seen that by moving the clamp 13 longitudinally of the rod 9 the position of the rod with respect to the axle may be adjusted.

Secured to the forward end of the rod 9 is a bracket 14 which has at its lower end a bearing flange 15. 16 is a vertical spindle projecting downward from the bracket 14. Rotatably mounted upon this spindle and held in place by the cotter pin 17 is a bearing member 18 having a bearing flange 19 in engagement with the bearing flange 15. 20, 20 are two arms which project downward and rearward from the bearing member 18. These arms carry at their lower end the pivot pin 21 upon which is rotatably mounted the guiding wheel 22.

Formed in the two flanges 15 and 19 are notches positioned to register with each other when the steering wheel is in substantially the position shown in Fig. 2. 23 is a lever pivoted to the bracket 14 and adapted at its lower end to enter the two notches before referred to when these notches are in register with each other. A spring 24 tends to move the lower end of the lever into the notches. The end of the lever is rectangular in cross section and the notch is rectangular, a positive lock being thus provided for the wheel when the lever engages the notch. When the lock is engaged, the wheel cannot be moved by any force applied to it. A cord 25 is connected to the upper end of the lever 23 and this cord 25 extends rearward to a point on the tractor within reach of the operator. It will be seen that when the lever 23 engages the notches the wheel 22 will be held against castering. The operator, however, by pulling the cord 25 can move the lever out of the notches and release the wheel to permit castering.

In order to lock the lever 23 in inoperative position, I provide the latch 26 which is adapted to automatically engage the tooth 27 formed on the upper part of the bracket 14. It is only necessary for the operator to pull the cord 25 far enough to permit the latch 26 to engage the tooth 27. The latch will then hold the lever 23 out of engagement with the notches and the cord 25 can be released.

In order that the operator from his position on the tractor may be able to release the latch 26, I provide the dog 28 which is pivoted at 29 to the flange 30 formed on the bracket 14. 31 is a lug projecting laterally from the rear part of the latch 26. When the latch is in engagement with the tooth 27 and the operator desires to release it, it is only necessary for him to pull the cord 25 to move the lever 23 farther forward. As the latch 26 moves forward with the lever, the dog 28 rides up on the dog 31 until the dog moves past it, whereupon it falls by gravity to the position shown in Fig. 4. The operator then releases the cord 25 and the lever 23 is moved backward by the spring 24. The latch 26 instead of again engaging the tooth 27 is carried up over the tooth because of the engagement of the lug 31 with the upper surface of the dog 28.

In operation, when it is desired to follow a substantially straight furrow, the parts are positioned as shown in the drawings and the wheel 22 is locked against castering. The wheel travels in the previous furrow and causes the tractor to follow at a uniform distance therefrom. The distance of the tractor from the furrow can be regulated as desired by moving the clamp 13 longitudinally of the rod 9, thereby moving the wheel 22 to the right or the left from the position shown.

When it is desired to make a sharp turn, either at the end of the furrow or to avoid an obstruction, the operator releases the wheel 22 to permit castering by pulling on the cord 25 sufficiently to engage the latch 26 with the tooth 27. The axle 3 can then be freely turned by means of the manual steering mechanism and the bars 9 and 10 will freely swing, the wheel 22 trailing behind as the rod 9 is moved to the right or the left. After the turn has been made, and it is again desired to rely upon the automatic steering device, the operator again pulls the cord 25 and causes the lug 31 to engage the upper surface of the dog 28. As soon as the cord is released, the spring 24 returns the lever 23 to the position shown in Fig. 4 and the wheel is again locked.

It will be noted that the steering wheel is concavo-convex and that the forward part of it is inclined inward so that it crowds against the furrow wall. In this way the device is held up to its work and there is no tendency for the wheel to move over toward the plowed ground.

The above described sleeve 13 on the rod 9 is, as shown in Figs. 1 and 2, formed in two parts with clearance between their edges, each of the two parts having lateral ears through which pass bolts that permit the clamp halves 13 to be loosened and slipped in either direction along the bar 9. Similarly, the bracket 14 is, as shown in Fig. 4, formed with horizontally projecting spaced clamp elements with ears and bolts which permit them to be loosened from, or clamped to, the end of the rod 9 in desired position. There are also vertically arranged spaced clamp elements with bolts for clamping the rod and bracket to the vertical spindle element 16.

When the bar 9 is adjusted from one angle to another relatively to the line of travel of the tractor by loosening the clamp 13 and slipping it along the arm 9, the steering wheel 22 can be put into proper position relatively to the furrow wall to correspond to the angle of inclination of the bar. The wheel, as above described, is concavo-convex in form; and by disposing its convex side in correspondence with the adjustment of the bar 9, and in relation to the furrow wall, its forward edge can be positioned to attain the proper degree of cutting into the earth and to bring the convex side into proper relation to the furrow wall. And as the clamp bracket 14 which carries the wheel also supports the parts which effect the locking and the unlocking of the wheel spindle, these parts, the lever 23, the catch 26, and the cord 25, are always held in proper working relationship.

I do not claim broadly the combination of a guiding furrow wheel, together with a castering carrier therefor, and means for locking the wheel in predetermined position where it is prevented from castering, on the one hand, or releasing it to permit it to freely caster, on the other; as I am aware that such wheels and carriers have been combined with plows.

But I believe myself to be the first to have provided a plowing tractor with a simple steering and guiding mechanism such as shown and described, it comprising a two-bar frame and a single frame, the bars being universally coupled directly to the tractor steering axle, one being a long inclined bar extending from the land end of said axle, and the other a bar extending from the furrow end of the axle and adjustably connected to the longer bar, and the said single wheel which supports the front ends of the bars, being arranged to run in the furrow and bear against the furrow wall, this wheel being connected to the frame in such way as to correspond to the angle of the bar.

What I claim is,—

1. The combination with the front wheels of a tractor and the manual steering means therefor, of an arm connected to swing with the wheels, a furrow wheel having a castering connection with the arm, a locking lever pivoted on the arm for holding the furrow wheel against castering, means within reach of an operator on the tractor for moving the locking lever out of operative position, a tooth on the arm, and a latch carried by the locking lever and adapted to engage the tooth to hold the lever out of operative position.

2. The combination with the front wheels of a tractor and the manual steering means therefor, of an arm connected to swing with the wheels, a furrow wheel having a castering connection with the arm, a locking lever pivoted on the arm for holding the furrow wheel against castering, a cord connected to the locking lever and extending to a point within reach of an operator on the tractor whereby the lever may be moved to inoperative position, a tooth on the arm, a latch carried by the locking lever and adapted to engage the tooth to hold the lever out of operative position, and a movable dog for guiding the latch over the tooth when the latch is moved by the cord past the tooth and then permitted to return.

In testimony whereof, I affix my signature, in presence of two witnesses.

JOHN B. BARTHOLOMEW.

Witnesses:
J. M. CALDWELL,
AGNES WISMAN.

Copies of this patent may be obtained for five cents each, by addressing the "Commissioner of Patents, Washington, D. C."